US012617642B2

(12) United States Patent
Tang et al.

(10) Patent No.:    US 12,617,642 B2
(45) Date of Patent:         May 5, 2026

(54) WINDING APPARATUS AND WINDING METHOD

(71) Applicant: CONTEMPORARY AMPEREX TECHNOLOGY (HONG LONG) LIMITED, Hong Kong (CC)

(72) Inventors: Linglong Tang, Ningde (CN); Feng Pan, Ningde (CN); Wei Zhang, Ningde (CN); Yuqian Wen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 364 days.

(21) Appl. No.: 18/474,254

(22) Filed: Sep. 26, 2023

(65) Prior Publication Data

US 2024/0017947 A1     Jan. 18, 2024

Related U.S. Application Data

(63) Continuation of application No. PCT/CN2022/101825, filed on Jun. 28, 2022.

(30) Foreign Application Priority Data

Aug. 30, 2021     (CN) .......................... 202111003970.3

(51) Int. Cl.
B65H 18/08        (2006.01)
B65H 23/04        (2006.01)
             (Continued)

(52) U.S. Cl.
CPC ........... B65H 18/08 (2013.01); B65H 23/044 (2013.01); H01M 10/0409 (2013.01);
             (Continued)

(58) Field of Classification Search
CPC ............. H01M 10/04; H01M 10/0404; H01M 10/0409; H01M 10/0431; H01M 10/0587;
             (Continued)

(56) References Cited

U.S. PATENT DOCUMENTS

2024/0313253 A1*    9/2024    Zhang ..................... B21C 47/04

FOREIGN PATENT DOCUMENTS

CN          201397863 Y      2/2010
CN          201804962 U      4/2011
             (Continued)

OTHER PUBLICATIONS

JP-2009029006-A translation from FIT database (Year: 2025).*
             (Continued)

*Primary Examiner* — Thomas J Hong
*Assistant Examiner* — Joshua D Anderson
(74) *Attorney, Agent, or Firm* — K&L Gates LLP

(57)          ABSTRACT

Disclosed are a winding apparatus and a winding method, the winding apparatus includes: a winding needle, being configured to wind a winding material; a power supply assembly, being configured to be electrically coupled to the winding needle, so as to form current on an axis of the winding needle; and a magnet supply assembly, being configured to provide a magnetic field to the winding needle, a magnetic field direction intersecting the axis of the winding needle so that the winding needle generates an ampere force for resisting a deformation of the winding needle in the magnetic field when the winding material is wound. By the above method, the present application may reduce the deformation of the winding needle, reduce a defective rate of a winding product formed by the winding of the winding material, and improve quality of the winding product.

11 Claims, 2 Drawing Sheets

(51) Int. Cl.
  *H01M 10/04* (2006.01)
  *H01M 10/0587* (2010.01)

(52) U.S. Cl.
  CPC ... *H01M 10/0431* (2013.01); *H01M 10/0587* (2013.01); *B65H 2555/41* (2013.01); *B65H 2601/24* (2013.01); *B65H 2701/19* (2013.01)

(58) Field of Classification Search
  CPC ........ H01M 4/08; H01M 4/139; H01M 6/005; Y10T 29/49108
  See application file for complete search history.

(56) References Cited

FOREIGN PATENT DOCUMENTS

| | | | |
|---|---|---|---|
| CN | 201893425 | U | 7/2011 |
| CN | 205004406 | U | 1/2016 |
| CN | 107081344 | A | 8/2017 |
| CN | 107966671 | A | 4/2018 |
| CN | 208548421 | U | 2/2019 |
| CN | 114171777 | A | 3/2022 |
| JP | H07256341 | A | 10/1995 |
| JP | 2009029006 | A * | 2/2009 |

OTHER PUBLICATIONS

International Search Report received in the corresponding International Application PCT/CN2022/101825, mailed Sep. 8, 2022.
Office Action issued to related CN Application No. 202111003970.3, dated Jan. 24, 2025, 14 pages (with English Translation).

* cited by examiner

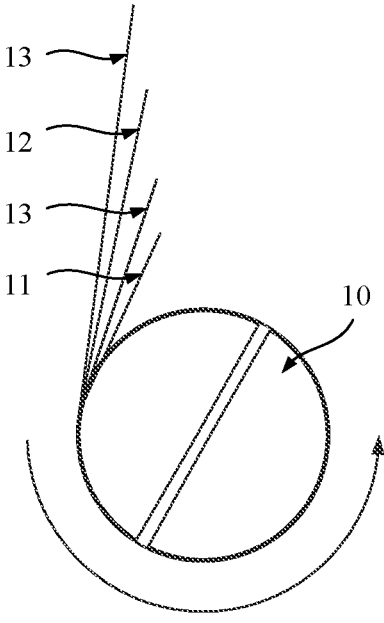

| Winding a winding material on a winding needle of the winding apparatus. |

| Energizing the winding needle to form current on an axis of the winding needle. |

| Providing a magnetic field to the winding needle, a magnetic field direction intersecting the axis of the winding needle so that the winding needle generates an ampere force for resisting deformation of the winding needle in the magnetic field. |

| When the winding needle rotates, adjusting an intensity of the current according to a tension of the winding material to the winding needle, and/or adjusting an intensity of the magnetic field according to the tension of the winding material to the winding needle. |

| When the winding needle rotates, rotating the magnet supply assembly around the winding needle, so as to adjust the magnetic field direction and reduce a resultant force of the tension and the ampere force applied to the winding needle. |

FIG. 3

WINDING APPARATUS AND WINDING METHOD

CROSS-REFERENCES TO RELATED APPLICATIONS

The present application is a continuation of International Application No. PCT/CN2022/101825, filed on Jun. 28, 2022, which claims priority to Chinese Patent Application 202111003970.3, filed on Aug. 30, 2021 and entitled "WINDING APPARATUS AND WINDING METHOD", the entire content of which is incorporated herein by reference.

TECHNICAL FIELD

Embodiments of the present application relate to the technical field of battery preparation device, and in particular, to a winding apparatus and a winding method.

BACKGROUND

A winding-type electrode assembly is widely used in the battery field due to its advantages of stable performance and high production efficiency. In a winding apparatus configured to prepare the winding-type electrode assembly, a main component thereof is a winding needle, the winding needle is configured to wind a winding material of a battery (generally including an electrode sheet and a membrane between the electrode sheet), where a structure and a shape of the winding needle may directly affect the production efficiency of the winding apparatus and the performance of the battery.

At present, when the winding material is wound, the winding needle may be deformed due to applying a tension of the winding material, and the more slender the winding needle is, the faster a rotating speed is, and the greater a deformation degree of the winding needle will be. After the winding needle is deforming, the electrode sheet and the membrane in the battery may also be deformed and wrinkled to varying degrees, so as to result a performance degradation of the electrode assembly and a failure to meet the required quality requirements.

SUMMARY

In view of the above problems, embodiments of the present application provide a winding apparatus and a winding method, so as to reduce a deformation of a winding needle, reduce a defective rate of a winding product formed by the winding of the winding material, and improve quality of the winding product.

According to an aspect of an embodiment of the present application, provided is a winding apparatus, including: a winding needle, being configured to wind a winding material; a power supply assembly, being configured to be electrically coupled to the winding needle, so as to form current on an axis of the winding needle; and a magnet supply assembly, being configured to provide a magnetic field to the winding needle, a magnetic field direction intersecting the axis of the winding needle so that the winding needle generates an ampere force for resisting deformation of the winding needle in the magnetic field when the winding material is wound. The winding apparatus in an embodiment of the present application, when being wound, according to a size and a tension direction of the winding material to the winding needle, the magnetic field is provided to the winding needle by the magnet supply assembly, and the current is provided to the winding needle by the power supply assembly, so that the ampere force applied to an energized winding needle in the magnetic field may offset part or all tension of the winding material to the winding needle. Compared with a traditional winding device, this method reduces the deformation of the winding needle, reduce a defective rate of a winding product formed by the winding of the winding material, and improve quality of the winding product. At the same time, a size of an axial direction of the winding needle may be made larger, a size of a radial direction may be made smaller, and an overall structure is more slender.

In an optional manner, the winding apparatus further includes a controller and a pressure sensor, the pressure sensor is configured to detect a tension of the winding material to the winding needle, and the controller is configured to adjust an intensity of the magnetic field and/or an intensity of the current according to the tension detected by the pressure sensor. An embodiment of the present application monitors the tension of the winding needle applied by the winding material in real time by providing the pressure sensor, so that the controller may adjust the intensity of the magnetic field and/or adjust the intensity of the current passing through the winding needle according to the tension detected by the pressure sensor, so as to realize an automatic adjustment of the ampere force applied to the winding needle in the magnetic field, reduce the deformation of the winding needle, and make adjustment and control more accurate and reliable.

In an optional manner, the power supply assembly includes a current regulator, the current regulator is electrically coupled to the winding needle and the controller, respectively, and the controller adjusts the intensity of the current by controlling the current regulator. In a present embodiment, the controller may automatically adjust the current passing through the winding needle in real time by controlling the current regulator, the control is simple and convenient, and a precise automatic adjustment and control may be realized.

In an optional manner, the magnet supply assembly includes a first excitation coil and a second excitation coil, the first excitation coil and the second excitation coil are provided on two opposite sides of the winding needle; and respective magnetic poles of the first excitation coil and the second excitation coil on sides directed toward the winding needle are opposite magnetic poles; and the controller controls the intensity or the magnetic field direction by adjusting current of the first excitation coil and/or the second excitation coil. In a present embodiment, the controller may control the intensity of the current passing through any one of the first excitation coil and the second excitation coil, so as to change the intensity of the magnetic field, and at the same time, it may further change a current direction of the first excitation coil and the second excitation coil, adjust the respective magnetic poles of the first excitation coil and the second excitation coil on sides toward the winding needle, and change the magnetic field direction passing through the winding needle. This way greatly improves a flexibility of the adjustment of the magnetic field passing through the winding needle.

In an optional manner, the first excitation coil and the second excitation coil are provided symmetrically with respect to the axis of the winding needle. In this way, a magnetic field direction between the first excitation coil and the second excitation coil is perpendicular to the axis of the winding needle, the structure is simple, and it is convenient for a calculation of the ampere force, which is beneficial to reduce the difficulty of regulating and controlling the magnetic field. In an optional manner, the magnet supply assembly can rotate around the winding needle. In an embodiment of the present application, by setting that the magnet supply assembly rotate around the winding needle, the magnet supply assembly may change following an occur by rotating around the winding needle when the tension direction of the winding material to the winding needle changes in a process of winding, so as to ensure that a resultant force of the ampere force and the tension applied to the winding needle is in a relatively small state, thereby reducing the deformation of the winding needle.

In an optional manner, the power supply assembly further includes a first conductive slip ring and a second conductive slip ring, the first conductive slip ring is socketed on one end of the winding needle, and the second conductive slip ring is socketed on the other end of the winding needle, and where the power supply assembly is electrically coupled to the winding needle by the first conductive slip ring and the second conductive slip ring. In a present embodiment, by setting the first conductive slip ring and the second conductive slip ring respectively rotate and be socketed at two ends of the winding needle, it may prevent a connecting wire between the power supply assembly and the two ends of the winding needle from being twisted or broken in the process of winding of the winding needle.

In an optional manner, the winding apparatus further includes clamping assemblies and a driving assembly, the clamping assemblies include a first clamping assembly and a second clamping assembly, and the first clamping assembly and the second clamping assembly are respectively supported at the two ends of the winding needle, at least one of the first clamping assembly and the second clamping assembly is clamped and fixed with the winding needle and is coupled to the driving assembly, so as to drive and lead the winding needle to rotate by the driving assembly. In a present embodiment, the two ends of the winding needle are respectively supported by the first clamping assembly and the second clamping assembly, so as to reduce a vibration of the winding needle when winding; further, when the first clamping assembly and the second clamping assembly are respectively fixedly coupled to the two ends of the winding needle, and are respectively driven by the driving assembly, when the winding needle is winding, the two ends of the winding needle may start quickly at the same time, and the structure is stable when rotating, the vibration is small, a torque received is small, the deformation is small, and the winding needle may adopt a more slender structure.

According to another aspect of an embodiment of the present application, provided is a winding method, including the above winding apparatus, and the method further includes the following steps: winding a winding material on a winding needle of the winding apparatus; energizing the winding needle to form current on an axis of the winding needle; and providing a magnetic field to the winding needle, a magnetic field direction intersecting the axis of the winding needle so that the winding needle generates an ampere force for resisting deformation of the winding needle in the magnetic field. The method in the present embodiment may reduce the deformation of the winding needle in the process of winding, reduce a defective rate of a winding product formed by the winding of the winding material, and may improve the quality of the winding product, and the size of the axial direction of the winding needle may be made larger, the size of the radial direction may be made smaller, and the winding needle with the more slender overall structure may be used.

In an optional manner, the method further includes: when the winding needle rotates, adjusting an intensity of the current according to a tension of the winding material to the winding needle, and/or adjusting an intensity of the magnetic field according to the tension of the winding material to the winding needle. In a present embodiment, the intensity of the current and/or the intensity of the magnetic field passing through the winding needle may be adjusted so as to adjust the ampere force applied to the winding needle in the magnetic field according to the tension of the winding material to the winding needle, so as to reduce a resultant force applied to the winding needle, and reduce the deformation of the winding needle.

In an optional manner, the method further includes: when the winding needle rotates, rotating the magnet supply assembly around the winding needle, so as to adjust the magnetic field direction and reduce a resultant force of the tension and the ampere force applied to the winding needle. In a present embodiment, the magnet supply assembly rotates around the winding needle, so as to adjust the magnetic field direction according to a tension direction of the winding material to the winding needle, and reduce the resultant force of the tension and the ampere force applied to the winding needle, so as to reduce a deformation by force of the winding needle.

The above description is only a summary of the technical solutions of the embodiments of the present application. In order to understand the technical means of the present application more clearly, it may be implemented in accordance with the content of the specification; and in order to make the above and other objectives, features, characteristics and advantages of the present application more obvious and easy to understand, and the specific embodiments of the application are cited below.

BRIEF DESCRIPTION OF DRAWINGS

Various other advantages and benefits will become apparent to those of ordinary skilled in the art upon reading the following detailed description of the preferred embodiments. The drawings are for purposes of illustrating preferred embodiments only and are not to be considered limiting of the present application. Also, the same components are denoted by the same reference symbols throughout the whole drawings. In the drawings:

FIG. 2 shows a working schematic diagram of a winding material of an electrode assembly formed by winding of a winding needle provided by an embodiment of the present application.

FIG. 3 shows a flow chart of a winding method provided by an embodiment of the present application.

Figure 1:
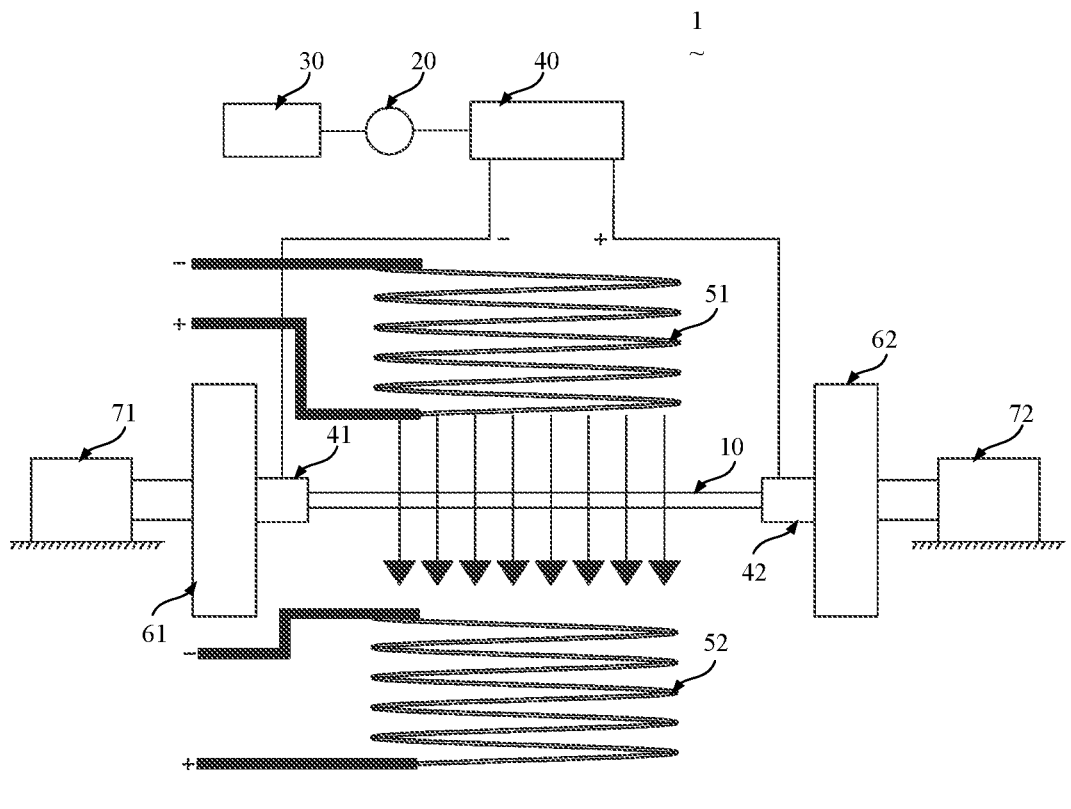
FIG. 1 shows a schematic structural diagram of a winding apparatus provided by an embodiment of the present application.

The reference numbers of the drawings in the specific embodiment are as follows:

1. Winding apparatus; 11. First electrode sheet; 12. Second electrode sheet; 13. Membrane; 10. Winding needle; 20. Controller; 30. Pressure sensor; 40. Current regulator; 41. First conductive slip ring; 42. Second conductive slip ring; 51. First excitation coil; 52. Second excitation coil; 61. First clamping assembly; 62. Second clamping assembly; 71. First servo motor; 72. Second servo motor.

DESCRIPTION OF EMBODIMENTS

A detailed description of the technical solutions about the embodiments of the present application will be given below, in combination with the accompanying drawings. The following examples are only used to illustrate the technical solutions of the present application more clearly, and are therefore only used as examples, and cannot be used to limit the protection scope of the present application.

It should be noted that, unless otherwise specified, the technical or scientific terms used in the embodiments of the present application should have their ordinary meanings understood by those skilled in the field to which the embodiments of the present application belong.

In the description of the embodiments of the present application, the technical terms "first" and "second' are only intended for a purpose of description, and shall not be understood as an indication or implication of relative importance or implicit indication of the quantity of indicated technical features. In the descriptions in the embodiments of the present application, the meaning of "a plurality of" is two or more, unless otherwise explicitly specified.

In the description of the embodiments of the present application, unless otherwise explicitly specified and defined, the terms "connecting" and "fixing" should be understood in a broad sense, for example, they may be a fixed connection, or a detachable connection, or an integrated connection; may be a mechanical connection, or may be an electrical connection; may be a direct connection and may also be an indirect connection via an intermediate medium, may be communication between the interiors of two elements or interaction of two components. For those of ordinary skill in the art, the specific meanings of the above terms in the embodiments of the present application may be understood according to specific circumstances.

At present, a method for preparing an electrode assembly mainly includes a laminated-type and a winding-type. The laminated-type refers to combining a first electrode sheet, a second electrode sheet and a membrane to form the electrode assembly by means of stacking, while the winding-type refers to forming a first electrode sheet, a second electrode sheet and a membrane to the electrode assembly by means of winding in virtue of a winding apparatus. A winding-type method for preparing the electrode assembly is widely used because of its high producing efficiency and good quality.

The applicant found through research that in a process of winding, a winding needle of the winding apparatus is easily deformed due to applying a tension of a winding material, and the deformation of the winding needle may easily lead to the poor winding and affect winding efficiency. The specific manifestations are: the first electrode sheet, the second electrode sheet and the membrane are prone to misalignment, which makes the electrode assembly formed by winding prone to have a risk of short circuit in subsequent use; the first electrode sheet, the second electrode sheet and the membrane are prone to wrinkles, so as to cause an increase of a volume of the electrode assembly formed by winding, thereby reducing a battery capacity. That is, the deformation of the winding needle may lead to a decrease of the quality of the electrode assembly formed by winding, which may eventually lead to a decrease of performance of the battery. Further, the smaller a diameter of the winding needle, the longer a length, and the faster a rotation speed, the greater the deformation of the winding needle would be, and the poorer the performance of the electrode assembly formed by winding would be.

In order to solve the problem in the prior art that the poor winding is caused by the deformation of the winding needle due to the tension applied by the winding material during the process of winding the winding material, thereby reducing the quality of a winding product, starting from the above problem, the applicant found that by applying current to the winding needle and providing a magnetic field passing through the winding needle, an ampere force applied to the winding needle may offset part or all tension of the winding material to the winding needle, which may effectively reduce the deformation of the winding needle, thereby improving the quality of the winding product. The technical solution of the present application will be described in detail below.

An embodiment of the present application provides a winding apparatus 1 in one aspect, please refer to FIG. 1, and FIG. 1 shows a schematic structural diagram of a winding apparatus 1 provided by an embodiment of the present application. The winding apparatus 1 includes: a winding needle 10, a power supply assembly and a magnet supply assembly. Where the winding needle 10 being configured to wind a winding material; the power supply assembly being electrically coupled to the winding needle 10, and being configured to form current on an axis of the winding needle 10; the magnet supply assembly being configured to provide a magnetic field to the winding needle 10, a magnetic field direction intersecting a direction of an axis of the winding needle 10 so that the winding needle 10 generates an ampere force for resisting deformation of the winding needle 10 in the magnetic field when the winding needle 10 winding the winding material.

The winding needle 10 may be made of a conductive material, the conductive material includes but is not limited to metal materials such as copper, iron, magnesium, aluminum, etc., the metal material may be a single metal, or may be an alloy. It may be understood that the winding needle 10 may also be a composite being made of the conductive material and an insulating material, such as by coating and electroplating a conductive material layer on a winding needle base being made of the insulating material, or coating and electroplating an insulating material layer on the winding needle base being made of the conductive material. The winding needle 10 may be, but not limited to, a structural component such as a rod or a bar with a predetermined length. A shape of the winding needle 10 may be a prism (such as a regular quadrangular prism, a regular pentagonal prism, etc.), a cylinder, etc., but not limited to this. The winding needle 10 may also be other shapes or structural components formed by a plurality of structural parts with different shapes, which is not specifically limited in the present application. The winding material may be a material configured to form an electrode assembly by winding, and of course it may also be a material configured to form other winding products. For the convenience of explanation, a present embodiment is described by taking that the winding material is a material forming a winding-type electrode assembly as an example. Specifically, as shown in FIG. 2, FIG. 2 shows a working schematic diagram of a winding material of an electrode assembly formed by winding of a winding needle 10 provided by an embodiment of the present application; the winding material includes a first electrode sheet 11, a second electrode sheet 12 and a membrane 13. The electrode assembly may be formed by winding the first electrode sheet 11, the second electrode sheet 12 and the membrane 13 by using the winding needle 10, and then the electrode assembly is put into a container filled with electrolyte to form a battery cell. The battery cell may include a lithium-ion secondary battery, a lithium-ion primary battery, a lithium-sulfur battery, a sodium-lithium-ion battery, a sodium-ion battery or a magnesium-ion battery, etc., which are not limited by the embodiments of the present application. The battery cell may be cylindrical, flat, cuboid or in another shape, which is not limited in the embodiments of the present application. The battery cell is generally divided into three types according to a way of packaging: a cylindrical battery, a prismatic batter and a pouch battery, which is also not limited in the embodiments of the present application.

The power supply assembly may include a power supply (not shown in the drawings), the power supply may be a DC power supply, a positive electrode output end and a negative electrode output end of the power supply are respectively directly or indirectly electrically coupled to two ends of the winding needle 10, a voltage applied to the two ends of the winding needle 10 by the positive electrode output end and the negative electrode output end of the power supply form a potential difference, and current flowing along the direction of the axis of the winding needle 10 is formed on the winding needle 10.

A magnetic field direction provided by the magnet supply assembly to the winding needle 10 intersecting the direction of the axis of the winding needle 10, that is, the magnetic field direction intersecting a current direction after energizing the winding needle 10, so that the winding needle 10 generates an ampere force for resisting deformation in the magnetic field when the winding needle 10 winding the winding material.

Where the intensity and the magnetic field direction may be fixed, or may be adjustable, which is not limited in the present application. An included angle forming by intersecting the direction of the axis of the winding needle 10 and the magnetic field direction generated by the magnet supply assembly is in a range of (0, 180), that is, the direction of the axis of the winding needle 10 may or may not be perpendicular to the magnetic field direction. Preferably, the direction of the axis of the winding needle 10 is perpendicular to and intersecting the magnetic field direction generated by the magnet supply assembly.

When in use, an acting force (that is, an ampere force) is applied to the winding needle 10 after energizing in the magnetic field, and a magnitude of the ampere force applied to the winding needle 10 is f=IBLsinα, where I is current passing through the winding needle 10, B is an intensity of the magnetic field provided by the magnet supply assembly, L is a length of the winding needle 10, and α is an included angle between the current direction in the winding needle 10 and the magnetic field direction, where the current direction is consistent with the direction of the axis of the winding needle 10.

In an embodiment of the present application, current flowing along the direction of the axis is provide by the power supply assembly to the winding needle 10, the magnetic field passing through the winding needle 10 is provided by the magnet supply assembly, and the magnetic field direction intersects the current direction, so that the ampere force applied to the winding needle 10 after energizing in the magnetic field may offset part or all tension of the winding material to the winding needle 10 when the winding needle 10 winding the winding material. Compared with a traditional winding device, a winding apparatus 1 of the present application reduces the deformation of the winding needle 10, reduces a possibility of deformation and dislocation of the winding material when winding, reduces a defective rate of a winding product formed by the winding of the winding material, and improves the quality of the winding product; meanwhile, a size of an axial direction of the winding needle 10 may be larger, and a size of a radial direction may be made smaller; and under a condition that a size and a structure of the winding needle 10 are the same, the winding needle 10 of the present application may be wounded at a higher rotational speed, which is beneficial to improving the winding efficiency. Where the axial direction of the winding needle 10 is the same as the current direction after energizing the winding needle 10, and is also a length direction of the winding needle 10, and the radial direction of the winding needle 10 is perpendicular to the axial direction.

Taking a winding material as a material for forming a winding-type electrode assembly as an example, when winding the winding material forming the electrode assembly, as a diameter of the winding needle 10 is smaller, more winding materials may be wound, and under the condition that a rotating speed of the winding needle 10 is not changed when winding, the winding needle 10 of the present application may adopt the winding needle 10 with a smaller diameter and a longer length, and a battery of the electrode assembly formed by winding the winding needle 10 may have a higher energy density and stable and reliable quality and performance.

In some embodiments, the winding apparatus 1 further includes a controller 20 and a pressure sensor 30, and the controller 20 is electrically coupled to the pressure sensor 30 and the power supply assembly, respectively, and the pressure sensor 30 is configured to detect the tension of the winding material to the winding needle 10, and the controller 20 is configured to adjust the intensity of the magnetic field and/or adjust the intensity of the current passing through the winding needle 10 according to the tension detected by the pressure sensor 30.

Where the controller 20 may be, but not limited to, a PLC controller 20, it may be an upper computer, a single chip computer, or other control circuits or control modules capable of realizing a control function.

The pressure sensor 30 may be provided in a tension adjusting mechanism of a feeding apparatus for transferring the winding material to the winding needle 10. Specifically, the pressure sensor 30 may be provided on a roller shaft in contact with the winding material in the tension adjusting mechanism, where the tension of the winding material detected by the pressure sensor 30 is the tension (that is, a pulling force) of the winding material applied to the winding needle 10.

In some embodiments, the controller 20 may adjust the intensity of the magnetic field provided by the magnet supply assembly according to the tension detected by the pressure sensor 30, so as to reduce or even eliminate a resultant force of an external force applied to the winding needle 10, and reduce the deformation of the winding needle during the process of winding.

In some embodiments, the controller 20 may adjust the intensity of the current provided by the power supply assembly to the winding needle 10 according to the tension detected by the pressure sensor 30, so as to reduce or even eliminate the resultant force of the external force applied to the winding needle 10, and reduce the deformation of the winding needle 10 during the process of winding.

In some embodiments, the controller 20 may simultaneously adjust the intensity of the magnetic field provided by the magnet supply assembly and the intensity of the current provided by the power supply assembly to the winding needle 10 according to the tension detected by the pressure sensor 30, so as to reduce or even eliminate the resultant force of the external force applied to the winding needle 10, and reduce the deformation of the winding needle 10 during the process of winding.

In the embodiment of the present application, the pressure sensor 30 is provided to monitor the tension of the winding material applied to the winding needle 10 in real time, when the pressure sensor 30 detects that the tension of the winding material changes, it may be transmitted to the controller 20 in a way of an electrical signal. The controller 20 converts the received electrical signal into a corresponding tension value, and adjusts the intensity of the magnetic field and/or adjusts the intensity of the current passing through the winding needle 10 according to a formula of the ampere force and a two-force balance condition through a predetermined algorithm, thereby realizing an automatic adjustment of the ampere force applied to the winding needle 10 in the magnetic field, reduce the deformation of the winding needle 10, and make adjustment and control more accurate and reliable.

In some embodiments, since the rotating speed of the winding needle 10 is unstable at an initial stage of winding, a relatively large tension is applied to the winding needle 10 of the winding material, and at this time, the intensity of the current and/or the intensity of the magnetic field passing through the winding needle 10 may be increased to increase the magnitude of the ampere force applied to the winding needle 10 and reduce the deformation degree of the winding needle 10; at a stage when the rotating speed of the winding needle 10 is stable, the tension of the winding material applied to the winding needle 10 becomes smaller, and at this time, the intensity of the current and/or the intensity of the magnetic field passing through the winding needle 10 may be reduced, the ampere force applied to the winding needle 10 may be reduced, and the deformation degree of the winding needle 10 may be reduced.

In some embodiments, the power supply assembly includes a current regulator 40, the current regulator 40 is electrically coupled to the winding needle 10 and the controller 20, respectively, and the controller 20 adjusts current passing through the winding needle 10 by adjusting the current regulator 40.

In some embodiments, the current regulator 40 and the controller 20 may be electrically coupled to a power supply, so that the power supply may provide electricity required for operation to the current regulator 40 and the controller 20, where the power supply is electrically coupled to the two ends of the winding needle 10 through the current regulator 40. Specifically, the positive electrode output end of the power supply is electrically coupled to the positive electrode input end of the current regulator 40, the negative electrode output end of the power supply is electrically coupled to the negative electrode input end of the current regulator 40, the positive electrode output end of the current regulator 40 is electrically coupled to one end of the winding needle 10, and the negative electrode output end of the current regulator 40 is electrically coupled to the other end of the winding needle 10, that is, the positive electrode output end and the negative electrode output end of the power supply are electrically coupled to the winding needle 10 by the current regulator 40.

It should be noted that the current regulator 40 and the controller 20 may be powered by their respective own power supply. The current regulator 40 is a DC regulator, that is, the current regulator 40 is configured to regulate the direct current through the winding needle 10.

In a present embodiment, the controller 20 may automatically adjust the current passing through the winding needle 10 in real time by controlling the current regulator 40, the control is simple and convenient, and a precise automatic adjustment may be realized.

In some embodiments, the magnet supply assembly includes a first excitation coil 51 and a second excitation coil 52, the first excitation coil 51 and the second excitation coil 52 are provided on two opposite sides of the winding needle 10; and the controller 20 is electrically coupled to the first excitation coil 51 and the second excitation coil 52, respectively. The controller 20 may be further configured to control the intensity or the magnetic field direction passing through the winding needle 10 by controlling the intensity of the current passing through the first excitation coil 51 and/or the second excitation coil 52 according to the tension detected by the pressure sensor 30.

Where the first excitation coil 51 and the second excitation coil 52 may be a single excitation coil unit formed by spirally or swirly providing a metal wire, or may be an excitation winding formed by winding the metal wire on a base made of a ferromagnetic material.

In some embodiments, the controller 20 synchronously regulates the intensity of the current passing through the first excitation coil 51 and the second excitation coil 52 by an AC current regulator. Specifically, the controller 20 may be electrically coupled to the first excitation coil 51 and the second excitation coil 52 through one AC current regulator, that is, the positive electrode output end of the AC current regulator is electrically coupled to respective end of the first excitation coil 51 and the second excitation coil 52, and the negative electrode output terminal of the AC current regulator is electrically coupled to the respective other end of the first excitation coil 51 and the second excitation coil 52.

In some embodiments, the controller 20 respectively adjusts the intensity of the current passing through the first excitation coil 51 and the second excitation coil 52 independently through two independent AC current regulators. Specifically, the controller 20 is electrically coupled to the first excitation coil 51 and the second excitation coil 52 through two independent AC current regulators, respectively, that is, the first excitation coil 51 is electrically coupled to the controller 20 through one AC current regulator, and the second excitation coil 52 is electrically coupled to the controller 20 through another AC current regulator, and an independent adjustment of the first excitation coil 51 and the second excitation coil may also be realized.

It should be noted that, in some embodiments, the controller 20 may convert DC current of the power supply into AC current, and then transmit the AC current to the first excitation coil 51 and/or the second excitation coil 52 through the AC current regulator. Of course, it may be understood that, in other embodiments, the power supply assembly may also include an AC power supply, and the controller 20 is electrically coupled to the AC power supply and the AC current regulator, respectively, so as to supply the AC power supply to the first excitation coil 51 and/or the second excitation coil 52 through the AC current regulator.

In an embodiment of the present application, the controller 20 may control the intensity of the current passing through any one of the first excitation coil 51 and the second excitation coil 52, thereby changing the intensity of the magnetic field, and may also change the current directions of the first excitation coil 51 and the second excitation coil 52 at the same time, and adjust the polarities of the magnetic poles of the first excitation coil 51 and the second excitation coil 52 on sides toward the winding needle 10 to change the magnetic field direction passing through the winding needle 10. In this way, the flexibility of adjusting the magnetic field passing through the winding needle 10 is greatly improved. In addition, when the controller 20 simultaneously adjusts the intensity of the magnetic field provided by the magnet supply assembly and the intensity of the current provided by the power supply assembly to the winding needle 10 to reduce the degree of deformation of the winding needle 10, it may solve problems such as the winding needle 10, the first excitation coil 51 and the second excitation coil 52 have excessive heat due to excessive current and even affect the quality of the winding product or the working state of the winding apparatus 1 by reasonably distributing the current passing through the winding needle 10, the first excitation coil 51, and the second excitation coil 52.

In some embodiments, the first excitation coil 51 and the second excitation coil 52 are provided symmetrically with respect to the axis of the winding needle 10.

That is, a central axis of the first excitation coil 51 and a central axis of the second excitation coil 52 are perpendicular to the axis of the winding needle 10, that is, a magnetic field direction between the first excitation coil 51 and the second excitation coil 52 is perpendicular to the axis of the winding needle 10. In this way, the structure is simple, when the winding needle is winding, the ampere force applied to it is f=IBL, and it is convenient for a calculation of the ampere force, which is beneficial to reduce the difficulty of adjusting and controlling the magnetic field.

It should be understood by those skilled in the art that, in other embodiments, in the case that the intensity of the magnetic field provided by the magnet supply assembly is fixed, the first excitation coil 51 and the second excitation coil 52 may also be replaced by magnets. Where, a magnetic body may be a permanent magnetic body or a soft magnetic body. Specifically, the magnetic body may be a magnet, that is, the magnet supply assembly may be two magnets oppositely provided on two sides of the winding needle 10.

In some embodiments, the magnet supply assembly is provided to rotate around the winding needle 10.

Where the magnet supply assembly may be driven to rotate around the winding needle 10 by manpower, or the magnet supply assembly may also be driven to rotate around the winding needle 10 using an electromechanical control manner. Preferably, the magnet supply assembly is driven to rotate around the winding needle 10 using an electromechanical control manner. Specifically, the magnet supply assembly may rotate around the winding needle 10 with the axis of the winding needle 10 as a center of rotation, that is, the first excitation coil 51 and the second excitation coil 52 rotate around the winding needle 10 with the axis of the winding needle 10 as the center of rotation. It may be understood that, in other embodiments, the magnet supply assembly may rotate around the winding needle 10 without taking the axis of the winding needle 10 as the center of rotation.

Since in the process of winding the winding needle 10, as a number of layers of the winding material wound on the winding needle 10 is getting more and more, a diameter of the winding material on an outer circumferential surface of the winding needle may be larger and larger, so that a drawing force direction of the winding material applied to the winding needle 10 may be changed, and if the magnetic field direction is not adjusted, it may cause the ampere force applied to the winding needle 10 not effectively reduce the tension of the winding material to the winding needle 10, thereby causing that the deformation of the winding needle may be aggravated.

Therefore, in an embodiment of the present application, the magnet supply assembly is provided to rotate around the direction of the axis of the winding needle 10, so that when the tension direction of the winding material to the winding needle 10 changes, the magnet supply assembly may rotate around the winding needle 10 to change the magnetic field direction accordingly, and finally, the ampere force applied to the winding needle 10 and the tension of the winding material applied to the winding needle 10 are always on a same straight line, and the directions are opposite, so as to ensure that the resultant force applied to the winding needle 10 is in a relatively small state, thereby reducing the deformation of the winding needle 10.

In some embodiments, the controller 20 may adjust the magnetic field direction in real time according to the tension direction, that is, drive the magnet supply assembly to rotate around the winding needle 10 in the electromechanical control manner, so as to reduce the deformation of the winding needle 10 by automatically adjusting the magnetic field.

In some embodiments, the power supply assembly further includes a first conductive slip ring 41 and a second conductive slip ring 42, the first conductive slip ring 41 is socketed on one end of the winding needle 10, and the second conductive slip ring 42 is socketed on the other end of the winding needle 10, and where the power supply assembly is electrically coupled to the winding needle 10 by the first conductive slip ring 41 and the second conductive slip ring 42.

Specifically, the two ends of the winding needle 10 are electrically coupled to the positive electrode output end and the negative electrode output end of the current regulator 40 by the first conductive slip ring 41 and the second conductive slip ring 42, respectively, that is, the first conductive slip ring 41 and the second conductive slip ring 42 are connectors for realizing electrically coupling of the power supply assembly and the winding needle 10. If a connecting wire of the power supply assembly is directly fixed and coupled to the two ends of the winding needle 10, the connecting wire is easily twisted and torn when the winding needle 10 is winding, so that the power supply assembly cannot continuously supply power to the winding needle 10 in the process of winding. Moreover, conductive slip rings may be used in the electromechanical system that requires transmitting power and a signal from a fixed position to a rotating position at any time that requires continuous rotation simultaneously. Therefore, in an embodiment of the present application, the first conductive slip ring 41 and the second conductive slip ring 42 respectively rotate and be socketed on the two ends of the winding needle 10, so that the power supply assembly may be prevented from being twisted and torn in a process of the rotation of the winding needle 10.

It should be noted that, in the present application, the two ends of the winding needle 10 do not only refer to two end parts of the winding needle 10 in the axial direction, but refer to positions on the winding needle 10 outside the winding material and not covered by the winding material when the winding needle 10 is winding the winding material.

In some embodiments, the winding apparatus 1 further includes clamping assemblies and a driving assembly, the clamping assemblies include a first clamping assembly 61 and a second clamping assembly 62, and the first clamping assembly 61 and the second clamping assembly 62 are respectively supported at two ends of the winding needle 10, at least one of the first clamping assembly 61 and the second clamping assembly 62 is clamped and fixed with the winding needle 10 and is coupled to the driving assembly, so as to drive and lead the winding needle 10 to rotate by the driving assembly.

Where the first clamping assembly 61 and the second clamping assembly 62 may be a clamp, such as a three jaw chuck, but not limited to this. The first clamping assembly 61 may be supported at one end of the winding needle 10 socketed with the first conductive slip ring 41, and the second clamping assembly 62 may be supported at the other end of the winding needle 10 socketed with the second conductive slip ring 42, of course, it may also be: the first clamping assembly 61 is supported at one end of the winding needle 10 socketed with the second conductive slip ring 42, and the second clamping assembly 62 is supported at the other end of the winding needle 10 socketed with the first conductive slip ring 41.

One of the first clamping assembly 61 and the second clamping assembly 62 may be clamped and fixed with one end of the winding needle 10, the other may be clamped and fixed or rotate and coupled to the other end of the winding needle 10, and the driving assembly is fixed and coupled to the clamped and fixed one, so that the driving assembly may lead the winding needle 10 to rotate by the first clamping assembly 61 and/or the second clamping assembly 62 fixed with it.

As a preferred embodiment, the first clamping assembly 61 and the second clamping assembly 62 are respectively clamped and fixed at the two ends of the winding needle 10. The driving assembly includes a first servo motor 71 and a second servo motor 72, an output shaft of the first servo motor 71 is fixed and coupled to the first clamping assembly 61, and an output shaft of the second servo motor 72 is fixed and coupled to the second clamping assembly 62.

In the winding process of the winding needle 10, if only one end of the winding needle 10 is clamped and fixed by one of the first clamping assembly 61 and the second clamping assembly 62, a vibration is likely to occur. In addition, if one end of the winding needle 10 is driven by a motor and the other end is passively rotate, this may make rotating speeds at the two ends of the winding needle 10 are not consistent at the initial stage of rotation, so that a torque is generated to the winding needle 10, and the winding needle 10 is easily torqued and distorted.

Therefore, in an embodiment of the present application, one end of the winding needle 10 is fixed with the rotating shaft of the first servo motor 71 by the first clamping assembly 61, and the other end of the winding needle 10 is fixed with the rotating shaft of the second servo motor 72 by the second clamping assembly 62, so that the two ends of the winding needle 10 may rotate simultaneously when winding. In this way, the winding needle 10 may start quickly, and the structure is stable when rotating, and the structure is stable when rotating, the vibration is small, the torque received is small, the deformation is small, and a more slender winding needle 10 may be used, that is, a size of an axial direction of the winding needle 10 may be made larger, and a size of a radial direction may be made smaller.

In another aspect of the embodiment of the present application, a winding method is further provided, which may be configured to wind a winding material for producing an electrode assembly, but not limited to this, the winding method includes the winding apparatus 1 in the above embodiments, a specific structure and function of the winding apparatus 1 may refer to the contents described in the above embodiments, which may not be described in detail here, as shown in FIG. 3, and combined with FIG. 1, FIG. 3 shows a flow chart of a winding method provided by an embodiment of the present application, and the winding method includes the following steps:

winding a winding material on a winding needle 10 of the winding apparatus 1;

energizing the winding needle 10 to form current on an axis of the winding needle 10; and providing a magnetic field to the winding needle 10, a magnetic field direction intersecting the axis of the winding needle 10 so that the winding needle 10 generates an ampere force for resisting deformation of the winding needle 10 in the magnetic field.

The winding material may be a material configured to wind to form an electrode assembly, and of course may also be a material configured to wind to form other winding products, which is not specifically limited herein. Where the power supply assembly of the winding apparatus 1 is configured to supply power to the winding needle 10, so as to form current along the axial direction of the winding needle 10. The magnet supply assembly of the winding apparatus 1 is configured to provide a magnetic field passing through the winding needle 10 to the winding needle 10, and the magnetic field direction intersects the current direction.

In the method in an embodiment of the present application, the winding needle 10 is energized and the magnetic field passing through the winding needle 10 is provided, respectively in the process of winding, so that the ampere force applied to the winding needle may reduce at least part of the tension applied to the winding needle 10, so as to reduce the resultant force applied to the winding needle 10, reduce the deformation of the winding needle 10 in the process of winding, and reduce a defective rate of a winding product formed by the winding of the winding material, and improve quality of the winding product. Where the winding product may be an electrode assembly or other products formed by winding; and in this way, the size of the axial direction of the winding needle 10 may be made larger, the size of the radial direction may be made smaller, and the winding needle 10 with the more slender overall structure may be used.

In some embodiments, the method further includes: when the winding needle 10 rotates, adjusting an intensity of the current according to a tension of the winding material to the winding needle 10, and/or adjusting an intensity of the magnetic field according to the tension of the winding material to the winding needle 10.

Where the intensity of the current of the winding needle 10 may be adjusted by the power supply assembly, and the intensity of the magnetic field may be adjusted by the magnet supply assembly.

In a present embodiment, by adjusting at least one of the intensity of the current and the intensity of the magnetic field of the winding needle 10 according to the tension of the winding material to the winding needle 10, the ampere force applied to the winding needle 10 in the magnetic field may be adjusted, so as to reduce the resultant force applied to the winding needle 10, thereby reducing the deformation of the winding needle 10.

In some embodiments, when the winding needle 10 rotates, rotating the magnet supply assembly around the winding needle 10, so as to adjust the magnetic field direction and reduce a resultant force of the tension and the ampere force applied to the winding needle 10.

In a present embodiment, in the process of winding, the magnetic field direction is adjusted according to the tension direction of the winding material to the winding needle 10, and reduce the resultant force of the ampere force and the tension applied to the winding needle 10, so as to reduce a deformation by force of the winding needle 10.

Finally, it should be noted that: the above embodiments are merely used for illustrating rather than limiting the technical solutions of the present application. Although the present application is illustrated in detail with reference to the foregoing embodiments, those of ordinary skill in the art should understand that they may still modify the technical solutions recorded in the foregoing embodiments, or make equivalent substitutions to some or all of the technical features therein, but these modifications or substitutions may be made to the respective technical solutions without departing from the spirit and scope of the technical solutions of the embodiments of the present application, and they should be covered in the scope of the claims and the specification of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A winding apparatus, comprising:
a winding needle, being configured to rotate to wind a winding material on the winding needle;
a power supply assembly, being configured to be electrically coupled to the winding needle to form current on an axis of the winding needle; and
a magnet supply assembly, being configured to provide a magnetic field to the winding needle with a magnetic field direction intersecting the axis of the winding needle so that the winding needle with the current provided from the power supply assembly generates an ampere force for resisting deformation of the winding needle in the magnetic field when the winding material is wound on the winding needle.

2. The winding apparatus according to claim 1, wherein the winding apparatus further comprises a controller and a pressure sensor, the pressure sensor is configured to detect a tension of the winding material to the winding needle, and the controller is configured to adjust an intensity of the magnetic field and/or an intensity of the current according to the tension detected by the pressure sensor.

3. The winding apparatus according to claim 2, wherein the power supply assembly comprises a current regulator, the current regulator is electrically coupled to the winding needle and the controller, respectively, and the controller adjusts the intensity of the current by controlling the current regulator.

4. The winding apparatus according to claim 2, wherein the magnet supply assembly comprises a first excitation coil and a second excitation coil, the first excitation coil and the second excitation coil are provided on two opposite sides of the winding needle; and respective magnetic poles of the first excitation coil and the second excitation coil on sides directed toward the winding needle are opposite magnetic poles; and
the controller controls the intensity or the magnetic field direction by adjusting the current of the first excitation coil and/or the second excitation coil.

5. The winding apparatus according to claim 4, wherein the first excitation coil and the second excitation coil are provided symmetrically with respect to the axis of the winding needle.

6. The winding apparatus according to claim 1, wherein the magnet supply assembly can rotate around the winding needle.

7. The winding apparatus according to claim 1, wherein the power supply assembly further comprises a first conductive slip ring and a second conductive slip ring, the first conductive slip ring is socketed on one end of the winding needle, and the second conductive slip ring is socketed on the other end of the winding needle, and wherein the power supply assembly is electrically coupled to the winding needle by the first conductive slip ring and the second conductive slip ring.

8. The winding apparatus according to claim 1, wherein the winding apparatus further comprises clamping assemblies and a driving assembly, the clamping assemblies comprise a first clamping assembly and a second clamping assembly, and the first clamping assembly and the second clamping assembly are respectively supported at two ends of the winding needle, at least one of the first clamping assembly and the second clamping assembly is clamped and fixed with the winding needle and is coupled to the driving assembly, so as to drive and lead the winding needle to rotate by the driving assembly.

9. A winding method, performed by a winding apparatus, the winding apparatus comprising:
a winding needle, being configured to wind a winding material on the winding needle;
a power supply assembly, being configured to be electrically coupled to the winding needle; and
a magnet supply assembly, being configured to provide a magnetic field to the winding needle, and wherein the method comprises:
winding a winding material on the winding needle of the winding apparatus by rotating the winding needle;
energizing the winding needle, by the power supply assembly, to form current on an axis of the winding needle; and
providing a magnetic field, by the magnet supply assembly, to the winding needle with a magnetic field direction intersecting the axis of the winding needle so that the energized winding needle generates an ampere force for resisting deformation of the winding needle in the magnetic field when the winding material is wound on the winding needle.

10. The winding method according to claim 9, wherein the method further comprises:
when the winding needle rotates, adjusting an intensity of the current according to a tension of the winding material to the winding needle, and/or adjusting an intensity of the magnetic field according to the tension of the winding material to the winding needle.

11. The winding method according to claim 9, wherein the method further comprises: when the winding needle rotates, rotating the magnet supply assembly around the winding needle, so as to adjust the magnetic field direction and reduce a resultant force of the tension and the ampere force applied to the winding needle.

* * * * *